(12) United States Patent
Haggard et al.

(10) Patent No.: US 11,312,234 B1
(45) Date of Patent: Apr. 26, 2022

(54) AXLE SYSTEM FOR A VEHICLE

(71) Applicant: FORD GLOBAL TECHNOLOGIES, LLC, Dearborn, MI (US)

(72) Inventors: Matthew Stephen Haggard, Livonia, MI (US); Jonathan Gretsky, Trenton, MI (US); Gary Nichols, Chelsea, MI (US); Michael Carter, Troy, MI (US); David Alan Robertson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/158,597

(22) Filed: Jan. 26, 2021

(51) Int. Cl.
*B60K 23/04* (2006.01)
*B60K 17/16* (2006.01)
*F16H 48/24* (2006.01)
*B60B 35/14* (2006.01)
*B60K 17/22* (2006.01)

(52) U.S. Cl.
CPC .............. *B60K 23/04* (2013.01); *B60B 35/14* (2013.01); *B60K 17/16* (2013.01); *B60K 17/22* (2013.01); *F16H 48/24* (2013.01); *B60K 2023/046* (2013.01)

(58) Field of Classification Search
CPC ............................................... B60K 2023/046
See application file for complete search history.

(56) References Cited

U.S. PATENT DOCUMENTS

| | | | | |
|---|---|---|---|---|
| 4,223,772 A | * | 9/1980 | Telford | B60K 17/3515 192/36 |
| 4,266,646 A | * | 5/1981 | Telford | B60B 35/14 192/69.43 |
| 4,811,824 A | * | 3/1989 | Kurihara | B60K 17/3515 192/35 |
| 5,520,272 A | | 5/1996 | Ewer et al. | |
| 5,908,080 A | * | 6/1999 | Bigley | B60K 17/3515 180/247 |
| 5,967,279 A | * | 10/1999 | Itoh | B60K 23/08 180/247 |
| 7,000,750 B2 | * | 2/2006 | Ewer | B60K 17/3515 192/69.41 |
| 2017/0057282 A1 | | 3/2017 | Fabian et al. | |
| 2020/0164743 A1 | | 5/2020 | Frenznick et al. | |

* cited by examiner

*Primary Examiner* — Leslie A Nicholson, III
(74) *Attorney, Agent, or Firm* — Vincent Mastrogiacomo; Brooks Kushman P.C.

(57) ABSTRACT

A vehicle axle includes first and second wheel hubs, first and second shafts, a hub lock, and a plug assembly. The first and second shafts extend into the first and second wheel hubs, respectively. The hub lock is configured to selectively couple the first shaft to the first wheel hub. The plug assembly is fixedly coupled to the second wheel hub and is fixedly coupled to the second shaft such that the second wheel hub, the second shaft, and the plug assembly rotate in unison.

20 Claims, 3 Drawing Sheets

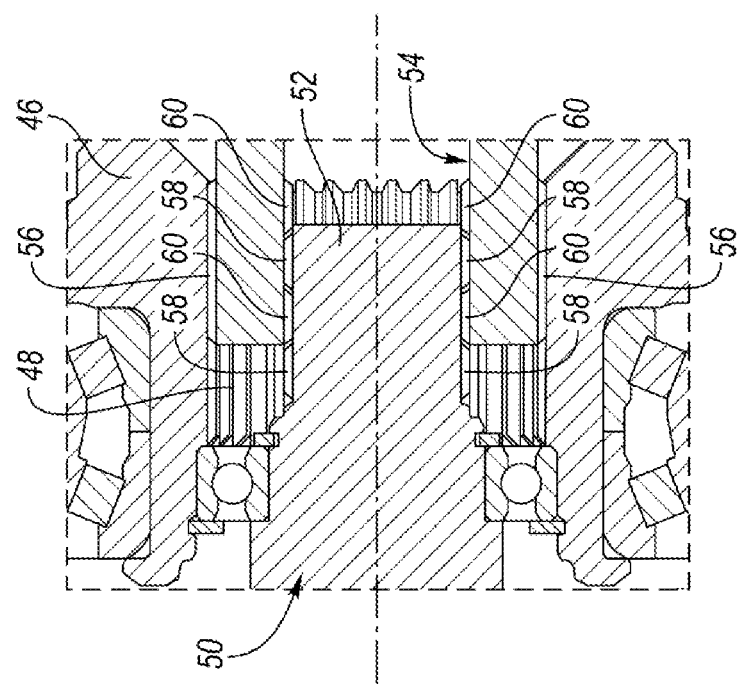
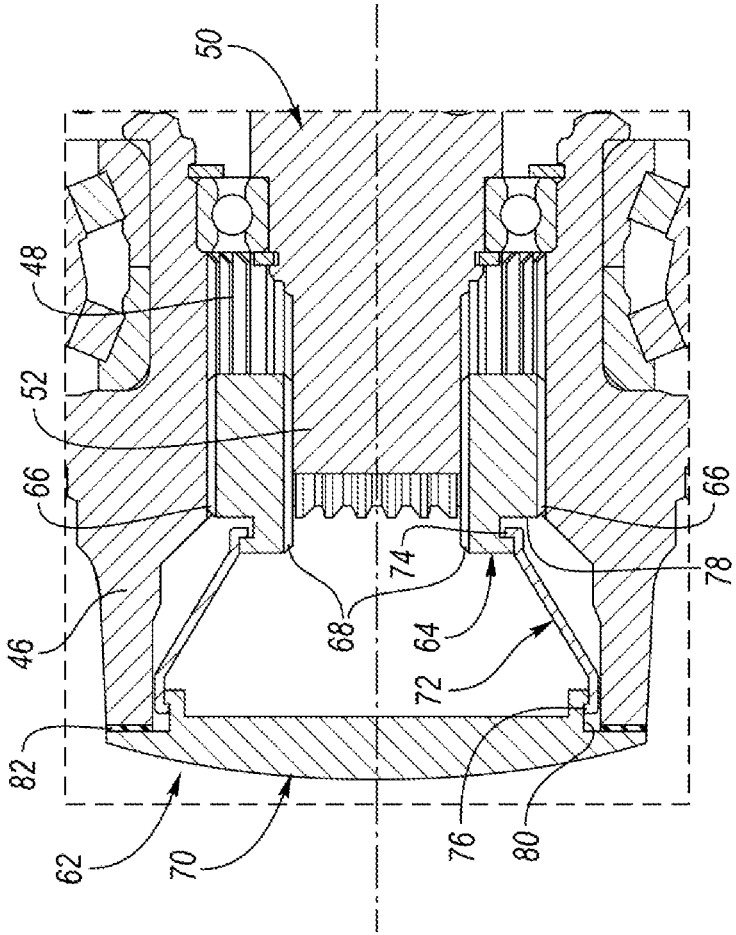
FIG. 3
FIG. 4

AXLE SYSTEM FOR A VEHICLE

TECHNICAL FIELD

The present disclose relates to vehicles and vehicle axles that are configured transfer power to wheels.

BACKGROUND

Vehicle drivetrains include several intermediate rotating components, such as axles, that connect power generating components (e.g., internal combustion engines, electric motors, etc.) to drive wheels.

SUMMARY

A vehicle axle includes a differential, first and second wheel hubs, first and second shafts, a hub lock, and a plug assembly. The first and second wheel hubs define first and second splined orifices, respectively. The first and second shafts extend away from the differential in opposing directions, respectively. The first and second shafts have splined ends that extend into the first and second splined orifices, respectively. The hub lock is secured to the first wheel hub via engaging the first splined orifice. The hub lock is configured to engage and disengage the splined end of the first shaft to couple and decouple the first shaft to and from the first wheel hub. The plug assembly is secured to the second wheel hub and to the second shaft such that the second wheel hub and the second shaft are secured to each other in a fixed arrangement via the plug assembly.

A vehicle axle includes first and second wheel hubs, first and second shafts, a hub lock, and a plug assembly. The first and second shafts extend into the first and second wheel hubs, respectively. The hub lock is configured to selectively couple the first shaft to the first wheel hub. The plug assembly is fixedly coupled to the second wheel hub and is fixedly coupled to the second shaft such that the second wheel hub, the second shaft, and the plug assembly rotate in unison.

A vehicle axle includes a differential, first and second wheel hubs, first and second shafts, a hub lock, and a plug assembly. The first and second shafts extend outward in opposing directions from the differential and into the first and second wheel hubs, respectively. The hub lock is secured to the first wheel hub and is configured to engage and disengage the first shaft to couple and decouple the first shaft to and from the first wheel hub. The plug assembly is secured to the second wheel hub and to the second shaft such that the second wheel hub and the second shaft are secured to each other in a fixed arrangement and rotate in unison.

BRIEF DESCRIPTION OF THE DRAWINGS

FIG. 2 is a cross-sectional view of a front axle of the vehicle taken along line 2-2 in

FIG. 1;

FIG. 3 is a cross-sectional view comprising area A from FIG. 2; and

FIG. 4 is a cross-sectional view comprising area B from FIG. 2.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
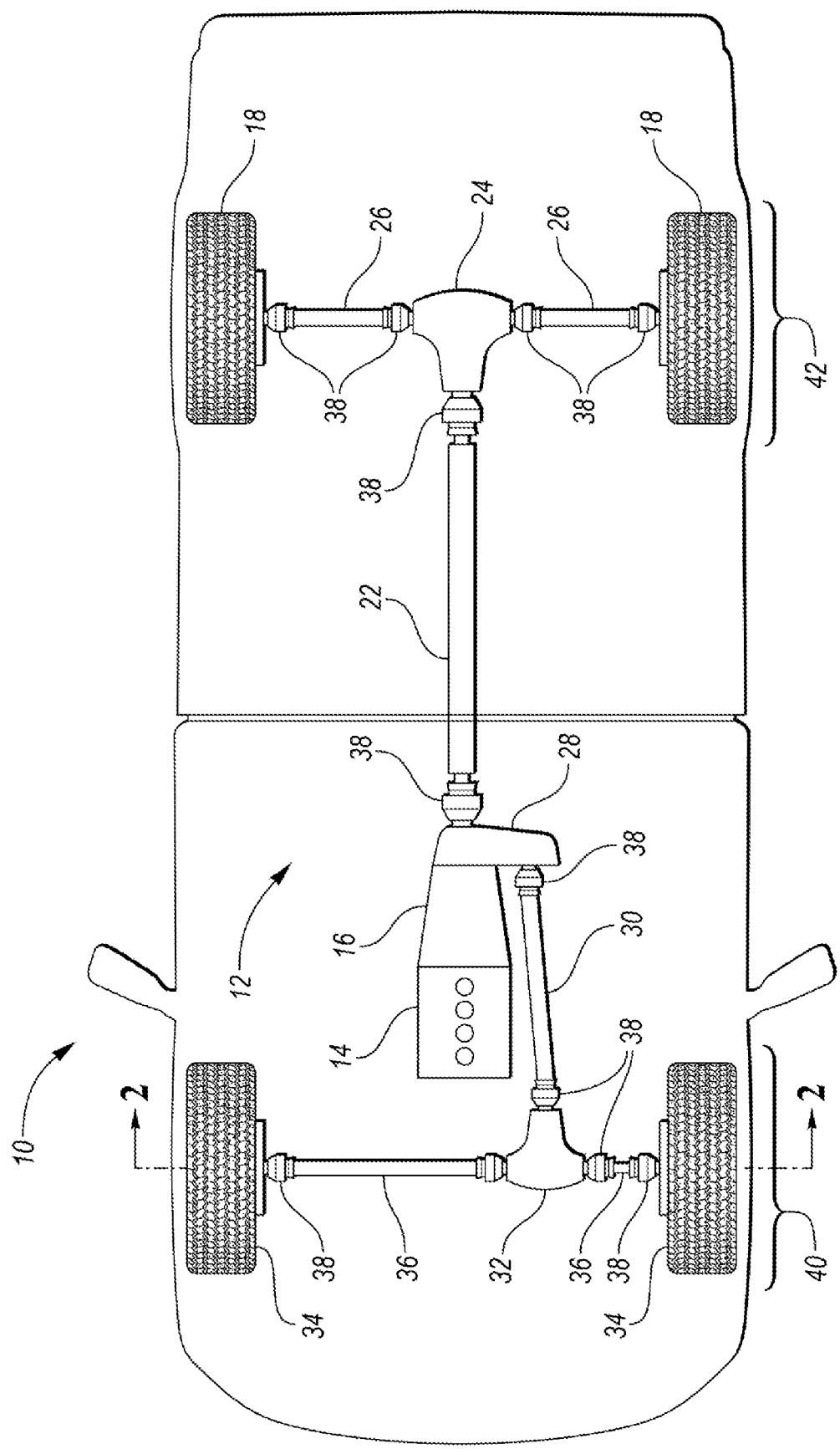
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The powertrain 12 may utilize other power generating components (e.g., electric motors or fuel cells) in addition to or in lieu of the engine 14. The transmission 16 may be configured to provide multiple gear ratios between an input and an output of the transmission 16. The engine 14 is connected to the input of the transmission 16 while drivetrain components that are configured deliver power to rear wheels 18 are connected to an output of the transmission 16. More specifically, the engine 14 may be connected to an input shaft of the transmission by a torque converter or a launch clutch while an output shaft of the transmission 16 may be connected to a rear driveshaft 22. The rear driveshaft 22 may then be connected to a rear drive unit (RDU) 24. The RDU 24 may then be connected to the rear wheels 18 by rear half shafts 26. The RDU 24 may include a differential and/or one more clutches to control the power output to the rear wheels 18.

The powertrain 12 may also include a power transfer unit (PTU) 28, which also may be called a power takeoff unit or transfer case, disposed between the transmission 16 and the rear driveshaft 22. The PTU 28 may include a clutch that selectively couples a front driveshaft 30 to the output of the transmission 16. The front driveshaft 30 may then be connected to a front drive unit (FDU) 32. The FDU 32 may then be connected to the front wheels 34 by front half shafts 36. The FDU 32 may include a differential and/or one more clutches to control the power output to the front wheels 34.

The various components of the powertrain 12, including the output shaft of the transmission 16, rear driveshaft 22, RDU 24, half shafts 26, rear wheels 18, PTU 28, front driveshaft 30, front half shafts 36, and front wheels 34 may be connected to each other via universal or constant-velocity joints 38. Constant-velocity joints connect two rotating parts and allow the two rotating parts to rotate about different axes. The RDU 24, rear wheels 18, half shafts 26, and constant-velocity joints 38 disposed between the RDU 24 and rear wheels 18 may collectively form a front axle 40 of the vehicle 10. The FDU 32, front wheels 34, half shafts 36, and constant-velocity joints 38 disposed between the FDU 32 and front wheels 34 may collectively form a rear-axle 42 of the vehicle 10.

Although FIG. 1 depicts a rear-wheel drive vehicle that is capable operating in a four-wheel drive or all-wheel drive (AWD) mode via the PTU 28, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle. A PTU may also be connected to the transaxle. The PTU may be connected to an RDU in the same manner as described above relative the rear-wheel drive vehicle depicted in FIG. 1. When engaged the PTU may be configured to transfer power from the from axle to the RDU.

The PTUs and RDUs, in all embodiments, may function in the same manner as a differential to allow a speed differential between the wheels on a single axle. Clutches within the PTUs and the RDUs may be controlled to limit the speed differential between the wheels on a single axle such that the PTUs and RDUs operates as a limited slip differential. The PTUs and the RDUs may be controlled in unison to allow a speed differential between the wheels located on of the different axles of the vehicle. Controlling the PTUs and the RDUs to allow a speed differential between the wheels located on different axles of the vehicle may be referred to as an AWD mode.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
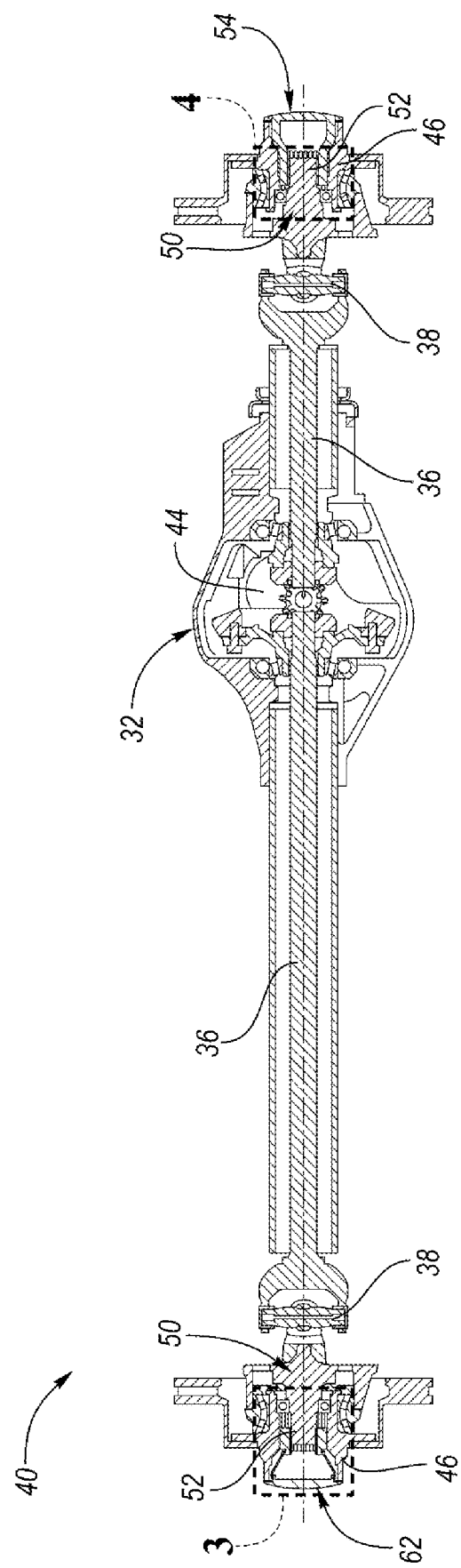

Referring now to FIGS. 2-4, the front axle 40 and portions of the front axle are described in further detail. The FDU 32 is shown to include a differential 44 that is connected to the two half shafts 36. The half shafts 36 extend away from the differential 44 in opposing directions, respectively. The half 36 on the driver side of the vehicle 10 may be shorter than the half shaft 36 on the passenger side of the vehicle 10. The half shafts 36 may be referred to as first and second shafts. The front axle 40 also includes a pair of wheel hubs 46, which may be referred to as first and second wheel hubs 46. Each wheel hub 46 defines a splined orifice 48. The splined orifices 48 may be referred to as first and second splined orifices.

The front axle 40 also includes a pair of stub shafts 50 that extend away from the differential 44 in opposing directions. The stub shafts 50 may be referred to as first and second stub shafts. Each stub shaft 50 extends into one of the splined orifices 48. More specifically, each stub shaft 50 has a splined end 52 that extends into one of the splined orifices 48. Each stub shaft 50 is connected to one of the half shafts 36 via one of the constant-velocity joints 38. Each half shaft 36 and the respective stub shaft 50 that each half shaft 36 is connected to via one of the constant-velocity joints 38 may collectively be referred to as a single shaft.

The front axle 40 includes a hub lock 54 that is secured to a first of the wheel hubs 46 via engaging the splined orifice 48 of the first of the wheel hubs 46. More specifically, the hub lock 54 may include radially outward extending splines 56 that engage the splined orifice 48 in a fixed gearing arrangement.

The hub lock 54 may also be configured to engage and disengage the splined end 52 of a first of the stub shafts 50 to selectively couple and decouple a first of the shafts, that collectively includes the first of the stub shafts 50 and a first of the half shafts 36, to and from the first of the wheel hubs 46. More specifically, the splined end 52 of the first of the stub shafts 50 may have radially outward extending splines that have gaps forming teeth 58 while the hub lock 54 may radially inward extending splines that also form teeth 60. When the teeth 58 of the stub shaft 50 and the teeth 60 of the hub lock 54 are misaligned, as illustrated in FIG. 4, the first of the wheel hubs 46 is disconnected from and rotates independently of the first of the shafts, that collectively includes the first of the stub shafts 50 and the first of the half shafts 36. When the teeth 58 of the stub shaft 50 and the teeth 60 of the hub lock 54 are aligned, which may be accomplished by moving teeth 58 of the hub lock 54 toward the left in FIG. 4 by one tooth length relative to the teeth 58 of the stub shaft 50, the first of the wheel hubs 46 is connected to and is constrained to rotate in unison with the first of the shafts that collectively includes the first of the stub shafts 50 and the first of the half shafts 36.

A gearing arrangement may be a collection of rotating elements that are configured to impose specified speed relationships among elements. Some speed relationships, called fixed speed relationships, are imposed regardless of the state. A gearing arrangement imposing only fixed relationships is called a fixed gearing arrangement. A gearing arrangement that selectively imposes speed relationships is called a selectable or shiftable gearing arrangement. The spline connection between the hub lock 54 and the first of the wheel hubs 46 described above may be a fixed gearing arrangement while the spline connection (i.e., the connection that includes teeth 58 and teeth 60) between the hub lock 54 and the first of the stub shafts 50 may be a selectable or shiftable gearing arrangement.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled when the two elements are constrained to rotate as a unit or in unison under some operating conditions while also free to rotate at distinct speeds under other operation conditions. For example, the hub lock 54 and the first of the wheel hubs 46 described above may be fixedly coupled to one another while the hub lock 54 and the first of the stub shafts 50 may be selectively coupled to one another.

The hub lock 54 may be positioned manually between an engaged position (i.e., the position where the teeth 58 of the stub shaft 50 and the teeth 60 of the hub lock 54 are aligned) and a disengaged position (i.e., the position where the teeth 58 of the stub shaft 50 and the teeth 60 of the hub lock 54 are not aligned) to couple and decouple the first of the shafts, that collectively includes the first of the stub shafts 50 and the first of the half shafts 36, to and from the first of the wheel hubs 46, respectively. The hub lock 54 may also be positioned automatically between the engaged position (i.e., the position where the teeth 58 of the stub shaft 50 and the teeth 60 of the hub lock 54 are aligned) and the disengaged position (i.e., the position where the teeth 58 of the stub shaft 50 and the teeth 60 of the hub lock 54 are not aligned) via a pneumatic or vacuum system (not shown) to couple and decouple the first of the shafts, that collectively includes the first of the stub shafts 50 and the first of the half shafts 36, to and from the first of the wheel hubs 46, respectively. Such an automatic system may include a controller that is configured to transition the hub lock 54 between the engaged and disengaged positions based on a control algorithm. It should be understood that the hub lock 54 depicted herein is for illustrative purposes only and that the hub lock 54 may comprise any type of hub lock known in the art.

The controller may be part of a larger control system and may be controlled by various other controllers throughout the vehicle 10, such as a vehicle system controller (VSC). It should therefore be understood that the controller and one or more other controllers can collectively be referred to as a "controller" that controls various actuators in response to signals from various sensors to control functions of the vehicle 10. The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 10.

A plug assembly 62 is secured to a second of the wheel hubs 46 and to a second of the shafts, that collectively includes a second of the stub shafts 50 and a second of the half shafts 36, such that the second of the wheel hubs 46 and the second of the shafts are secured to each other in a fixed gearing arrangement (i.e., are fixedly coupled to each other) via the plug assembly 62. More specifically, the plug assembly 62 is fixedly coupled to the second of the wheel hubs 46 and to the second of the shafts, that collectively includes the second of the stub shafts 50 and the second of the half shafts 36, such that the second of the wheel hubs 46, the second of the shafts, and the plug assembly 62 rotate in unison.

The plug assembly 62 may include a collar 64 that is disposed within the splined orifice 48 defined by the second of the wheel hubs 46. The collar 64 is disposed about the second of the stub shafts 50. The collar 64 engages 64 the splined orifice 48 defined by the second of the wheel hubs 46 and the splined end 52 of the second of the stub shafts 50 such that the second of the wheel hubs 46 and the second of the shafts, that collectively includes the second of the stub shafts 50 and the second of the half shafts 36, are secured to each other in the fixed gearing arrangement (i.e., are fixedly coupled to each other) via the collar 64. More specifically, the collar 64 may include radially outward extending splines 66 that engage the splined orifice 48 defined by the second of the wheel hubs 46 in a fixed gearing arrangement, and the collar 64 may include radially inward extending splines 68 that engage the splined end 52 of the second of the stub shafts 50 such that the second of the wheel hubs 46, the second of the shafts, that collectively includes the second of the stub shafts 50 and the second of the half shafts 36, and the collar 64 are all secured to each other in the fixed gearing arrangement.

The plug assembly 62 includes a cover 70 that is secured to the second of the wheel hubs 46 and is disposed over the splined orifice 48 defined by the second of the wheel hubs 46. The plug assembly 62 includes a retainer clip 72 that is configured to secure the cover 70 to the second of the wheel hubs 46. The retainer clip 72 is disposed within the splined orifice 48 defined by the second of the wheel hubs 46. A first end 74 of the retain clip 72 is secured to the collar 64 and a second end 76 of the retainer clip 72 is secured to the cover 70. The collar 64 defines a first slot 78. The first end 74 of the retainer clip 72 is at least partially disposed within the first slot 78. The cover 70 defines a second slot 80. The second end 76 of the retainer clip 72 is at least partially disposed within the second slot 80. The plug assembly 62 includes a seal 82 that is disposed between the cover 70 and the second of the wheel hubs 46. The seal 82 may be configured to prevent an ingress of fluid into the splined orifice 48 defined by the second of the wheel hubs 46.

It should be understood that the designations of first, second, third, fourth, etc. for wheel hubs, shafts, axles, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle axle comprising:
   a differential;
   first and second wheel hubs defining first and second splined orifices, respectively;
   first and second shafts extending away from the differential in opposing directions, respectively, and having splined ends that extend into the first and second splined orifices, respectively;
   a hub lock secured to the first wheel hub via engaging the first splined orifice, and configured to engage and disengage the splined end of the first shaft to couple and decouple the first shaft to and from the first wheel hub; and
   a plug assembly secured to the second wheel hub and to the second shaft such that the second wheel hub and the second shaft are fixedly coupled to each other via the plug assembly.

2. The vehicle axle of claim 1, wherein the plug assembly includes a collar that is disposed within the second splined orifice, and wherein the collar engages the second splined orifice and the splined end of the second shaft such that the second wheel hub and the second shaft are secured to each other in the fixed arrangement.

3. The vehicle axle of claim 2, wherein the plug assembly includes a cover that is secured to the second wheel hub and is disposed over the second splined orifice.

4. The vehicle axle of claim 3, wherein the plug assembly includes a retainer clip that is configured to secure the cover to the wheel hub.

5. The vehicle axle of claim 4, wherein the retainer clip is disposed within the second splined orifice, a first end of the retainer clip is secured to the collar, and a second end of the retainer clip is secured to the cover.

6. The vehicle axle of claim 5, wherein the collar defines a first slot, and wherein the first end of the retainer clip is disposed within the first slot.

7. The vehicle axle of claim 6, wherein the cover defines a second slot, and wherein the second end of the retainer clip is disposed within the second slot.

8. The vehicle axle of claim 3, wherein the plug assembly includes a seal that is disposed between the cover and the second wheel hub and is configured to prevent an ingress of fluid into the second spline orifice.

9. The vehicle axle of claim 1, wherein the first shaft is a driver side shaft and the second shaft is a passenger side shaft.

10. A vehicle axle comprising:
first and second wheel hubs;
first and second shafts extending into the first and second wheel hubs, respectively;
a hub lock configured to selectively couple the first shaft to the first wheel hub; and
a plug assembly fixedly coupled to the second wheel hub and fixedly coupled to the second shaft such that (i) the second wheel hub and the second shaft are fixedly coupled to each other and (ii) the second wheel hub, the second shaft, and the plug assembly rotate in unison.

11. The vehicle axle of claim 10, wherein the plug assembly includes a collar disposed over the second shaft, wherein the collar engages the second shaft and the second wheel hub to fixedly couple the second shaft to the second wheel hub.

12. The vehicle axle of claim 11, wherein the plug assembly includes a cover that is secured to the second wheel hub.

13. The vehicle axle of claim 12, wherein the plug assembly includes a retainer clip that is configured to secure the cover to the wheel hub.

14. The vehicle axle of claim 13, wherein a first end of the retainer clip is secured to the collar and a second end of the retainer clip is secured to the cover.

15. The vehicle axle of claim 14, wherein the collar defines a first slot, and wherein the first end of the retainer clip is disposed within the first slot.

16. The vehicle axle of claim 15, wherein the cover defines a second slot, and wherein the second end of the retainer clip is disposed within the second slot.

17. The vehicle axle of claim 12, wherein the plug assembly includes a seal that is disposed between the cover and the second wheel hub.

18. A vehicle axle comprising:
a differential;
first and second wheel hubs;
first and second shafts extending outward in opposing directions from the differential and into the first and second wheel hubs, respectively;
a hub lock secured to the first wheel hub and configured to engage and disengage the first shaft to couple and decouple the first shaft to and from the first wheel hub; and
a plug assembly secured to the second wheel hub and to the second shaft such that the second wheel hub and the second shaft are fixedly coupled to each other and rotate in unison.

19. The vehicle axle of claim 18, wherein the plug assembly includes a collar disposed over the second shaft, wherein the collar engages the second shaft and the second wheel hub to fixedly couple the second shaft to the second wheel hub.

20. The vehicle axle of claim 19, wherein the plug assembly includes a cover that is secured to the second wheel hub, and wherein the plug assembly includes a retainer clip that is configured to secure the cover to the wheel hub.

* * * * *